United States Patent
An et al.

(10) Patent No.: US 9,145,813 B2
(45) Date of Patent: Sep. 29, 2015

(54) STRUCTURE FOR UTILIZING EXHAUST HEAT OF VEHICLE

(71) Applicant: Hyundai Motor Company, Seoul (KR)

(72) Inventors: Ho-Chan An, Gyeonggi-Do (KR); Jong-Ho Seon, Incheon (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/142,860

(22) Filed: Dec. 29, 2013

(65) Prior Publication Data

US 2015/0040544 A1    Feb. 12, 2015

(30) Foreign Application Priority Data

Aug. 6, 2013     (KR) ................. 10-2013-0092922

(51) Int. Cl.
*F01N 5/02*           (2006.01)
*F01N 3/02*           (2006.01)
(Continued)

(52) U.S. Cl.
CPC ............. *F01N 5/025* (2013.01); *F01N 1/166* (2013.01); *F01N 3/0205* (2013.01); *F01N 1/165* (2013.01); *F01N 1/18* (2013.01); *F01N 3/043* (2013.01); *F01N 2240/02* (2013.01); *F01N 2240/20* (2013.01); *F01N 2260/024* (2013.01); *F01N 2260/14* (2013.01); *F01N 2410/02* (2013.01); *F01N 2470/08* (2013.01); *F01N 2900/08* (2013.01); *F28D 21/0003* (2013.01); *Y02T 10/166* (2013.01)

(58) Field of Classification Search
CPC ........... F01N 1/165; F01N 1/166; F01N 1/18; F01N 3/0205; F01N 3/043; F01N 5/025; F01N 2240/02; F01N 2240/20; F01N 2260/024; F01N 2260/14; F01N 2410/02; F01N 2470/08; F01N 2900/08; F28D 21/0003; Y02T 10/166
USPC .................................. 60/287, 298, 320, 324
See application file for complete search history.

(56) References Cited

U.S. PATENT DOCUMENTS

2006/0053771 A1*    3/2006    Murata ........................... 60/285
2012/0060484 A1*    3/2012    Eder et al. ...................... 60/320
(Continued)

FOREIGN PATENT DOCUMENTS

JP        2003-314366 A    11/2003
JP        2010-168926 A    8/2010
(Continued)

*Primary Examiner* — Thomas Denion
*Assistant Examiner* — Jorge Leon, Jr.
(74) *Attorney, Agent, or Firm* — Mintz Levin Cohn Ferris Glovsky and Popeo, P.C.; Peter F. Corless

(57) ABSTRACT

A structure for utilizing exhaust heat of a vehicle is provided. The structure includes a first part that has an exhaust pipe in which exhaust gas having a predetermined temperature passes through and which is heated by exchanging heat with the exhaust gas. A bypass passageway is installed within the exhaust pipe and the exhaust gas is bypassed through the bypass passageway. A thermoelectric element is attached to an exterior of the exhaust pipe, formed by bonding a P-type semiconductor and an N-type semiconductor, and produces electricity using a thermoelectric effect. A second part is attached to the exterior of the thermoelectric element and coolant flows therein. A first exhaust gas passageway is installed in the second part in a longitudinal direction and the exhaust gas passes through the first exhaust gas passageway to heat the coolant.

4 Claims, 6 Drawing Sheets

(51) Int. Cl.
*F01N 1/16* (2006.01)
*F28D 21/00* (2006.01)
*F01N 3/04* (2006.01)
*F01N 1/18* (2006.01)

(56) References Cited

U.S. PATENT DOCUMENTS

| | | | |
|---|---|---|---|
| 2012/0073276 A1* | 3/2012 | Meisner et al. | 60/320 |
| 2012/0118344 A1* | 5/2012 | Schluck et al. | 136/201 |
| 2013/0000285 A1* | 1/2013 | Prior | 60/320 |
| 2013/0079981 A1* | 3/2013 | Meisner | 701/36 |
| 2013/0283764 A1* | 10/2013 | Schmidt et al. | 60/272 |
| 2014/0007916 A1* | 1/2014 | Azzouz et al. | 136/210 |
| 2014/0033702 A1* | 2/2014 | Limbeck et al. | 60/597 |
| 2014/0150840 A1* | 6/2014 | Vitek et al. | 136/210 |
| 2014/0318481 A1* | 10/2014 | Iriyama | 123/2 |
| 2014/0345662 A1* | 11/2014 | Gauss et al. | 136/205 |

FOREIGN PATENT DOCUMENTS

| | | |
|---|---|---|
| JP | 2010-275975 A | 12/2010 |
| WO | WO 2012139978 A2 * | 10/2012 |
| WO | WO 2013108287 A1 * | 7/2013 |

* cited by examiner

STRUCTURE FOR UTILIZING EXHAUST HEAT OF VEHICLE

CROSS-REFERENCE TO RELATED APPLICATIONS

This application claims priority under 35 U.S.C. §119 to Korean Patent Application No. 10-2013-0092922, filed on Aug. 6, 2013, in the Korean Intellectual Property Office, the disclosure of which is incorporated herein by reference in its entirety.

BACKGROUND

1. Field of the Invention

The present invention relates to a structure for utilizing exhaust heat of a vehicle, and more particularly, to a structure for utilizing exhaust heat of a vehicle that includes a bypass passage, a first exhaust gas passageway installed in a low-temperature part, and a second exhaust gas passageway formed between an exhaust pipe and the bypass passageway, and may be utilized both when the vehicle initially starts and when the vehicle runs in an overloaded state.

2. Description of the Related Art

In general, in a vehicle, depending on a running state of the vehicle, warming up and heating steps for an engine are performed when the vehicle initially starts, a thermoelectric power generating step is performed when the vehicle runs, and a bypassing step is performed when the vehicle runs on a slope or runs at an excessive speed (e.g., greater than a pre-determined speed). A temperature of a coolant is raised to a predetermined temperature using a thermostat which raises a temperature of the coolant when the vehicle initially starts, and a warming u device which includes a water pump that circulates the coolant, warms up an engine. The engine should be warmed up while being operated to a particular temperature until the vehicle can run smoothly run.

Exhaust heat of the vehicle, which is produced when the vehicle runs, generates electricity while passing through a thermoelectric element of a thermoelectric power generating device. In particular, the thermoelectric element refers to an element that uses a thermoelectric effect in which thermal energy is converted into electrical energy by converting a temperature difference between both element ends into electricity, or electrical energy is converted into thermal energy by allowing electricity to flow through the element to cause a temperature difference between both the element ends.

The thermoelectric element is used in a small-scale cooling device, a small-scale heating device, or a small-scale power generating device. The thermoelectric element used in a small-scale power generating device is called a thermoelectric power generating device, or a thermoelectric power generator. The thermoelectric power generator is mainly used as an electric power supply device of a radio communication device, an electric power supply device of a space ship, a power supply device of a nuclear-powered submarine, and a thermoelectric power generator installed in an exhaust system of a vehicle. When the vehicle runs on a slope (e.g., on an inclined road) or when the vehicle runs in an overloaded state due to an excessive speed of the vehicle, exhaust heat of the vehicle is quickly discharged to the exterior of the vehicle via a bypass passageway, and the warming up device or the thermoelectric power generating device is not operated.

However, since according to a structure for utilizing exhaust heat of a vehicle in the related art, there is a section where the warming up device or the thermoelectric power generating device is not operated for each state of the vehicle, utilization of a system may deteriorate. In other words, the warming up device is operated when the vehicle initially starts, the thermoelectric power generating device is operated when the vehicle runs after a temperature of exhaust gas increases to a particular temperature, and both the warming up device and the thermoelectric power generating device are not operated when the vehicle runs in an overloaded state.

SUMMARY

The present invention provides a structure for utilizing exhaust heat of a vehicle which may be utilized both when the vehicle initially starts and when the vehicle runs in an overloaded state, by integrating a warming up device and a thermoelectric power generating device.

An exemplary embodiment of the present invention provides a structure for utilizing exhaust heat of a vehicle that may include: a high-temperature part that includes an exhaust pipe in which high-temperature exhaust gas (e.g., exhaust gas of a predetermined temperature) passes through and which may be heated by exchanging heat with the exhaust gas, and a bypass passageway installed within the exhaust pipe and through which the exhaust gas may be bypassed; a thermoelectric element attached to the exterior of the exhaust pipe, formed by bonding a P-type semiconductor and an N-type semiconductor, and configured to produce electricity using a thermoelectric effect; a low-temperature part attached to the exterior of the thermoelectric element and in which coolant may flow; and a first exhaust gas passageway installed in the low-temperature part in a longitudinal direction and in which the high-temperature exhaust gas may pass through to heat the coolant, in which operations of warming up an engine and generating thermoelectric power may be performed simultaneously.

The structure for utilizing exhaust heat of a vehicle may further include a first valve formed between the exhaust pipe and the first exhaust gas passageway, and slidably installed to open and close the first exhaust gas passage. The first valve may be formed as a ring-shaped band coupled to the exhaust pipe. The high-temperature part (e.g., a first part) may include: a second exhaust gas passageway formed between the exhaust pipe and the bypass passageway to allow the exhaust gas to pass therethrough; and a second valve rotatably installed at a rear end of the bypass passage to adjust an amount of exhaust gas that is bypassed.

The low-temperature part (e.g., a second part) may include: a coolant passageway that comes into contact with (e.g., connects with) the exterior of the thermoelectric element, may be coupled to the exterior of the thermoelectric element, and may be configured to cool a contact surface with the thermoelectric element using the coolant that flows in the coolant passageway; a coolant distributor mounted to one side of the coolant passageway to communicate with the coolant passageway, and having a coolant inlet into which the coolant may flow; and a coolant collector mounted to the other side of the coolant passageway to communicate with the coolant passage, and having a coolant outlet from which the coolant maybe discharged, in which the coolant passageway, the coolant distributor, and the coolant collector may be integrally formed to be disposed in a longitudinal direction.

According to the exemplary embodiment of the present invention, the structure for utilizing exhaust heat of a vehicle may include the low-temperature part attached to the exterior of the thermoelectric element and in which coolant may flow; and the first exhaust gas passageway installed in the low-temperature part in a longitudinal direction and in which the high-temperature exhaust gas may pass through to heat the coolant, to cause the exhaust gas to pass through the first exhaust passageway when the vehicle initially starts to warm up the engine.

The first valve may be formed between the exhaust pipe and the first exhaust gas passage to open and close the first exhaust gas passageway, and thus, by integrating a warming up device and a thermoelectric power generating device, the first valve may be opened to allow the exhaust gas to pass through the first exhaust gas passageway when the vehicle initially starts, and the first valve may be closed to prevent the exhaust gas from passing through (e.g., blocking the exhaust gas) the first exhaust gas passageway when the vehicle runs and when the vehicle runs in an overloaded state.

The second valve may be disposed at the high-temperature part to adjust an amount of exhaust gas, which may pass through the bypass passageway and the coolant passage, the coolant distributor, and the coolant collector may be integrally formed to be disposed in a longitudinal direction to improve efficiency of the structure for utilizing exhaust heat.

Consequently, the structure for utilizing exhaust heat of a vehicle according to the present invention may perform functions of a warming up device of the engine and the thermoelectric power generating device simultaneously, to improve fuel efficiency of the vehicle, and systems, which was divided into two devices in the related art, may be integrated into a single system, to reduce a weight of the vehicle, and reduce production costs of components.

DETAILED DESCRIPTION

Figure 1:
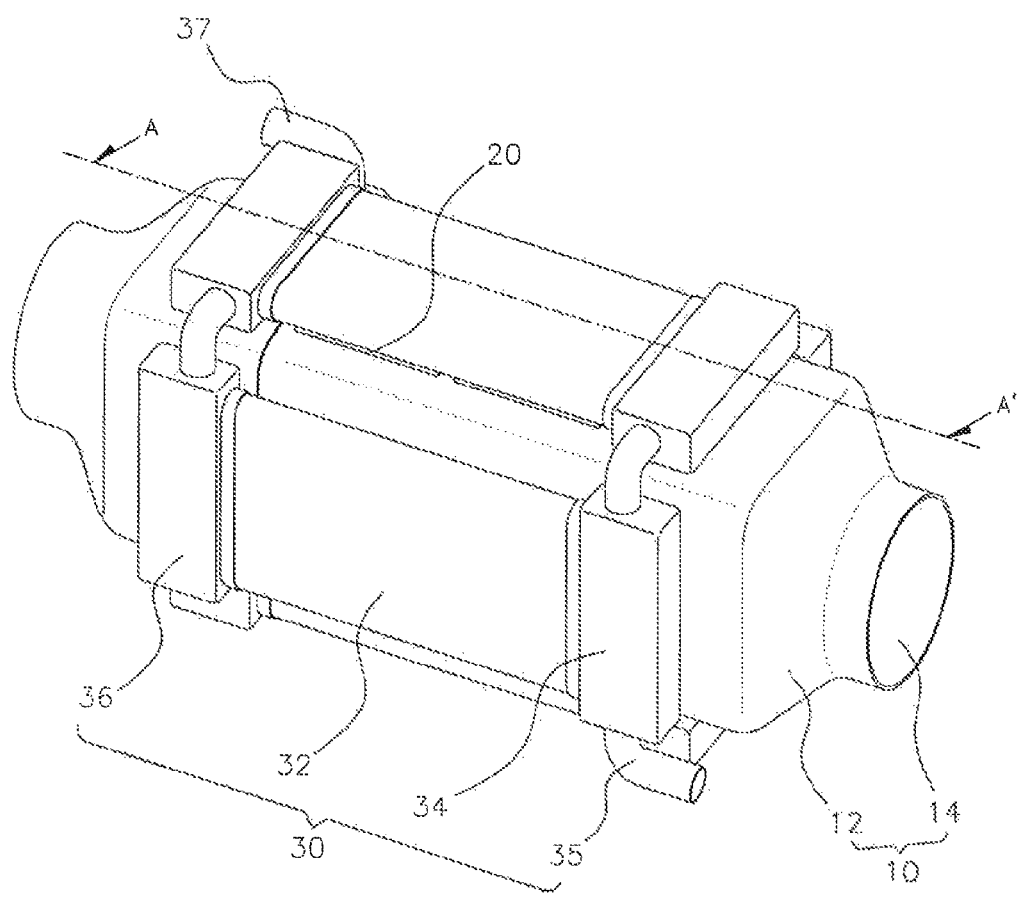
FIG. 1 is an exemplary view of a structure for utilizing exhaust heat of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the below methods are executed by at least one controller. The term controller/control unit refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, the present invention will be described in detail with reference to the accompanying drawings.

A structure for utilizing exhaust heat of a vehicle according to an exemplary embodiment of the present invention may include: a high-temperature part 10 (e.g., a first part) that may include an exhaust pipe 12 in which high-temperature exhaust gas (e.g., exhaust gas having a predetermined temperature) may pass through and which may be heated by exchanging heat with the exhaust gas, and a bypass passageway 14 installed within the exhaust pipe 12 and through which the exhaust gas may be bypassed; a thermoelectric element 20 attached to the exterior of the exhaust pipe 12, formed by bonding a P-type semiconductor and an N-type semiconductor, and may be configured to produce electricity using a thermoelectric effect; a low-temperature part 30 (e.g., a second part) attached to the exterior of the thermoelectric element 20 and in which a coolant may flow; and a first exhaust gas passageway 40 which may be installed in the low-temperature part 30 in a longitudinal direction and in which the high-temperature exhaust gas may pass through to heat the coolant, in which operations of warming up an engine and generating thermoelectric power may be performed simultaneously.

As illustrated in FIG. 1, the high-temperature exhaust gas may pass through the exhaust pipe 12, an inlet and an outlet of the exhaust pipe 12 may be formed in a substantially circular shape in the illustrated exemplary embodiment, and the exhaust pipe 12 may have a quadrangular container shape of which a cross section may be substantially quadrangular between the inlet and the outlet, but the exhaust pipe 12 may be formed in various shapes in accordance with the structure for utilizing exhaust heat.

Figure 2:
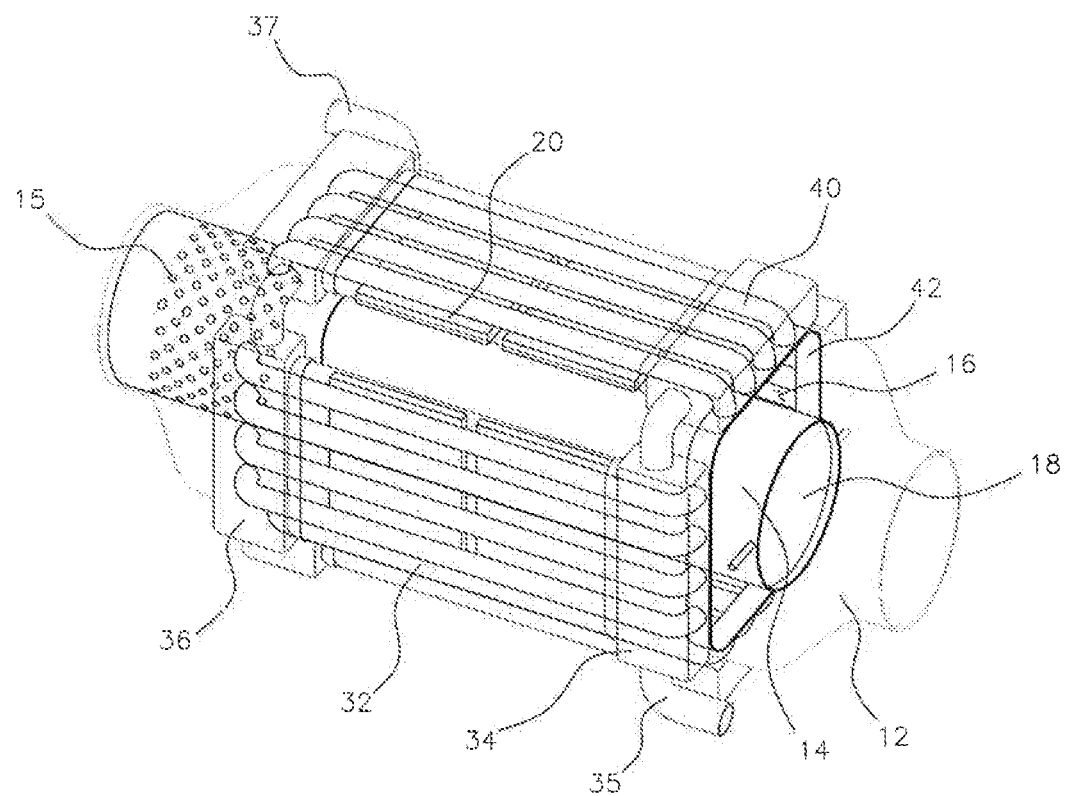
FIG. 2 is an exemplary view illustrating an interior of the structure for utilizing exhaust heat of a vehicle according to the exemplary embodiment of the present invention.

As illustrated in FIG. 2, the bypass passageway 14 may be installed within the exhaust pipe 12, and similarly to a typical bypass passageway, the bypass passageway 14 may be formed in a cylindrical shape to bypass the exhaust gas when the vehicle runs in an overloaded state. A plurality of exhaust apertures 15 through which the exhaust gas may flow when a second valve 18 is closed may be formed at an upstream portion of the bypass passageway 14. In addition, as illustrated in FIG. 2, the thermoelectric element 20 may be formed by bonding a P-type semiconductor and an N-type semiconductor, attached to the exterior of the exhaust pipe 12, and the thermoelectric elements 20 may be electrically connected to a battery (not illustrated) of the vehicle when the thermoelectric elements 20 are electrically connected to each other.

A portion where the thermoelectric element 20 may come into contact with (e.g., connect to) the exhaust pipe 12 may be heated by the exhaust gas, a portion where the thermoelectric element 20 may come into contact with the low-temperature part 30 may be cooled by the coolant, and therefore, a temperature difference between both side surfaces of the thermoelectric element 20 may occur. Further, due to the temperature difference, a thermoelectric effect may occur in the thermoelectric element 20 to produce electricity. The produced electricity may charge the battery of the vehicle electrically connected to the thermoelectric element 20.

Figure 3:
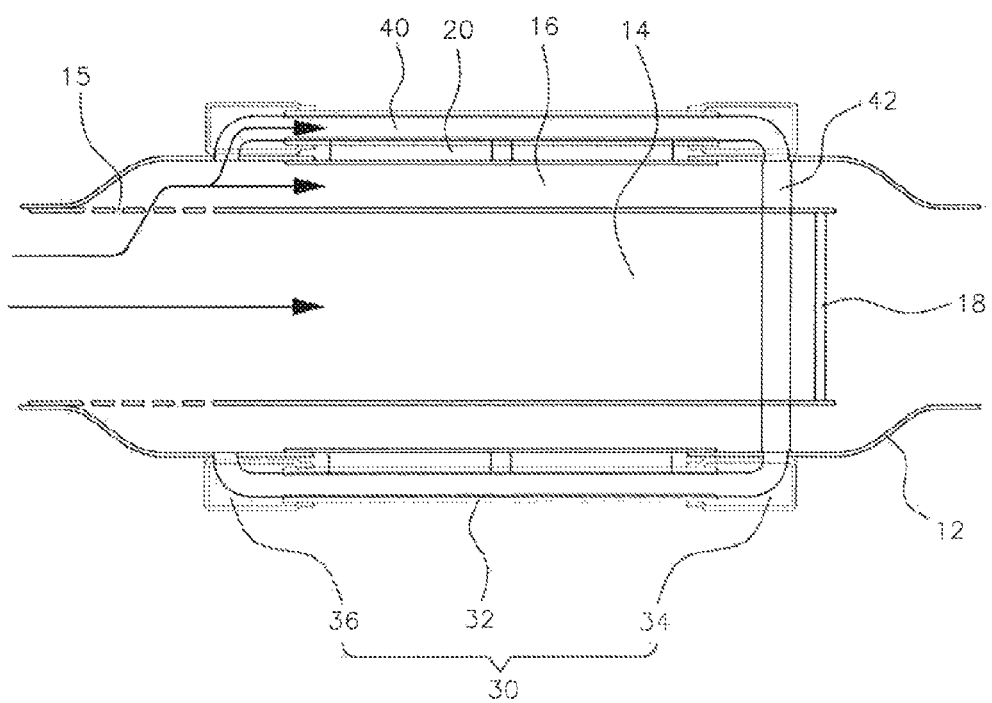
FIG. 3 is an exemplary cross-sectional view taken along line A-A' of FIG. 1 according to an exemplary embodiment of the present invention.

As illustrated in FIGS. 2 and 3, the low-temperature part 30 in which the coolant flows may be attached to the exterior of the thermoelectric element 20, and the first exhaust gas passageway 40 may be disposed within the low-temperature part 30 in a longitudinal direction. In the illustrated exemplary embodiment, a plurality of first exhaust gas passageways 40 may be disposed in a row in the low-temperature part 30, and may be formed in a pipe shape of which both ends are curved in a direction toward the exhaust pipe 12.

Figure 4:
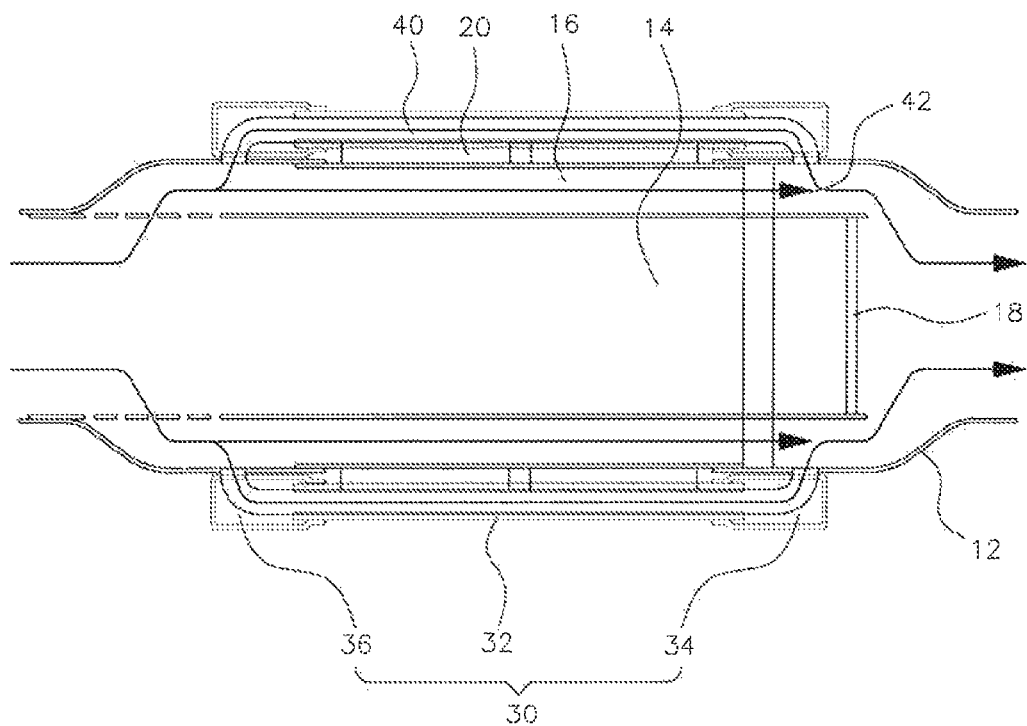
FIG. 4 is an exemplary cross-sectional view illustrating the structure for utilizing exhaust heat of a vehicle according to the exemplary embodiment of the present invention when the vehicle initially starts.

When the vehicle initially starts, the coolant may be heated by the exhaust gas that flows in through the first exhaust gas passageway 40, and the first exhaust gas passageway 40 may operate as a warming up device of the engine. As illustrated in FIGS. 2 and 3, a first valve 42 may be slidably installed between the exhaust pipe 12 and the first exhaust gas passageway 40 to open and close the first exhaust gas passageway 40. The first valve 42 may be formed as a ring-shaped band coupled to an inner circumferential surface of the exhaust pipe 12, and may slide forward and backward on the exhaust pipe 12 by a motor, controlled by a first valve controller (not illustrated), to open and close the first exhaust gas passageway 40. In other words, as illustrated in FIG. 4, when the vehicle initially starts, the first valve 42 may be moved forward to open the first exhaust gas passageway 40, and the exhaust gas may heat the coolant while passing through the first exhaust gas passageway 40.

Figure 5:
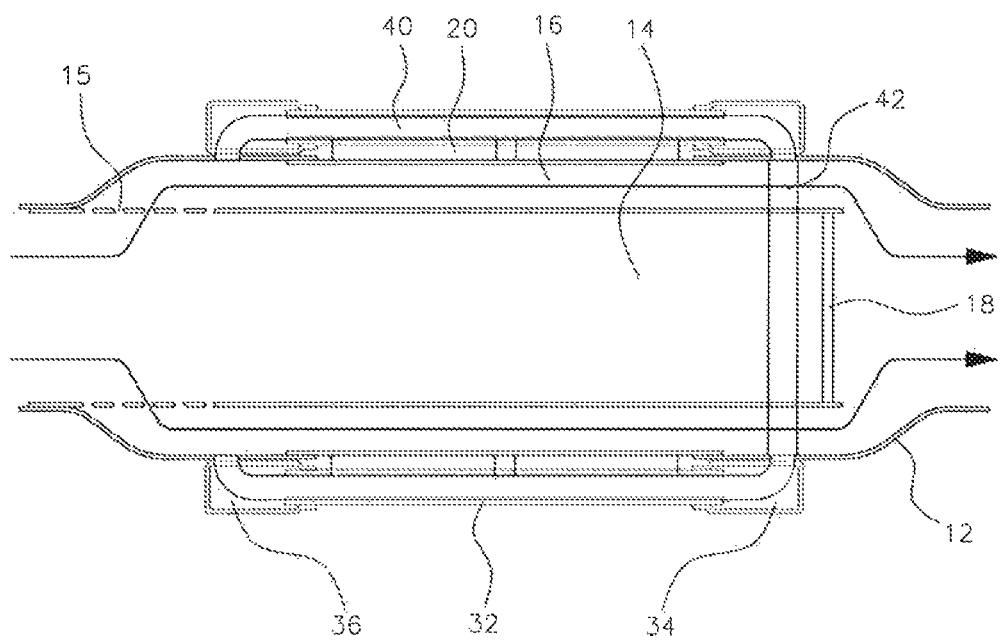
FIG. 5 is an exemplary cross-sectional view illustrating the structure for utilizing exhaust heat of a vehicle according to the exemplary embodiment of the present invention when the vehicle runs.
Figure 6:
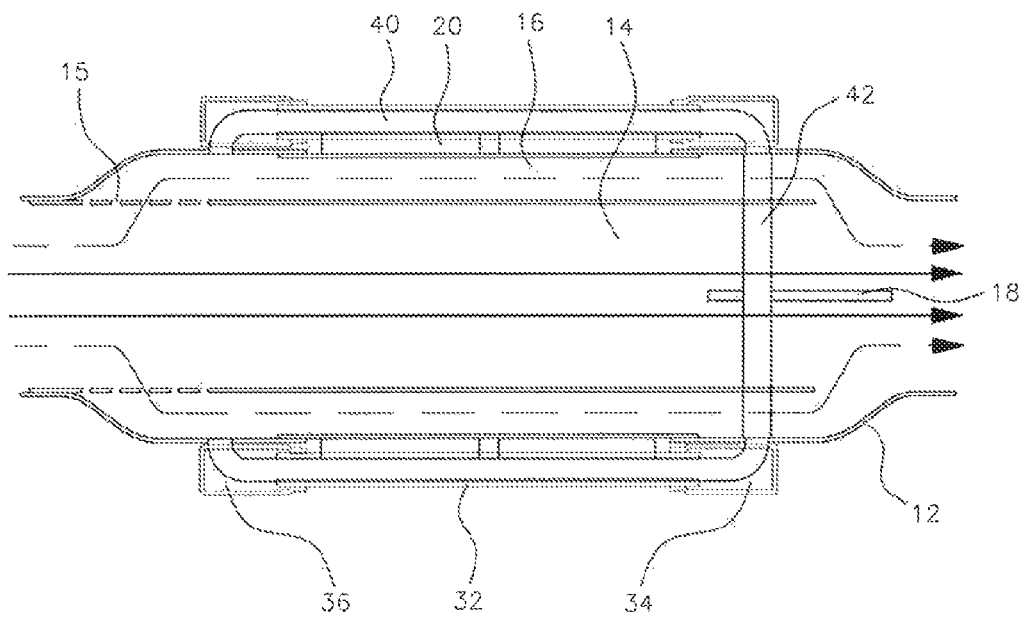
FIG. 6 is an exemplary cross-sectional view illustrating the structure for utilizing exhaust heat of a vehicle according to the exemplary embodiment of the present invention when the vehicle runs in an overloaded state.

As illustrated in FIGS. 5 and 6, when the vehicle runs or when the vehicle runs in an overloaded state, the first valve 42 may be moved backward to close the first exhaust gas passageway 40, and the exhaust gas may be configured to perform thermoelectric power generation with the thermoelectric element 20 or may be bypassed while passing through a second exhaust gas passageway 16 or the bypass passageway 14. The first valve 42 may be formed in a shape like a ring or may be formed in various shapes such as a straight line-shaped plate disposed in an inlet of the first exhaust gas passageway 40 and may be rotated, or a shape in which a cap protrudes from the exhaust pipe 12 to open and close the first exhaust gas passageway 40, in consideration of variations of the structure for utilizing exhaust heat of a vehicle, variations in shape of the first exhaust gas passageway 40, or utilization of overall exhaust heat of the vehicle.

As illustrated in FIGS. 2 and 3, the high-temperature part 10 may include the second exhaust gas passageway 16 formed between the exhaust pipe 12 and the bypass passageway 14 to allow the exhaust gas to pass therethrough, and the second valve 18 rotatably installed at a rear end of the bypass passageway 14 to adjust an amount of exhaust gas that is bypassed. When the first exhaust gas passageway 40 is closed by the first valve 42, and the bypass passageway 14 is closed by the second valve 18, the exhaust gas may heat one side surface of the thermoelectric element 20 while passing through the second exhaust gas passageway 16, and causing thermoelectric power generation to occur at the thermoelectric element 20.

To prevent the exhaust pipe 12 from being heated when the vehicle runs on a slope (e.g., an inclined road) or when the vehicle runs at a substantially high speed (e.g., a predetermined speed), that is, when a load of the engine is increased, the second valve 18 is opened when the vehicle runs in an overloaded state to allow most of the high-temperature exhaust gas to be discharged through the bypass passageway 14, to adjust an amount of exhaust gas, which flows between the bypass passageway 14 and the exhaust pipe 12. The second valve 18 may be formed in a circular plate shape, and may be installed at the rear end of the bypass passageway 14 to be rotatable by a motor by a second valve controller (not illustrated) to open and close the bypass passageway 14.

As illustrated in FIGS. 1 and 2, the low-temperature part 30 (e.g., the second part) may include: a coolant passageway 32 which comes into contact with the exterior of the thermoelectric element 20, may be coupled to the exterior of the thermoelectric element 20, and may be configured to cool a contact surface with the thermoelectric element 20 using the coolant that flows in the coolant passageway 32; a coolant distributor 34 mounted to one side (e.g., a first side) of the coolant passageway 32 to communicate with the coolant passageway 32, and may have a coolant inlet 35 into which the coolant may flow; and a coolant collector 36 mounted to the other side (e.g., a second side) of the coolant passageway 32 to communicate with the coolant passageway 32, and may have a coolant outlet 37 from which the coolant may be discharged.

In the illustrated exemplary embodiment, four coolant passageways 32 are coupled, respectively, to an outer surface of the exhaust pipe 12, which may be formed in a quadrangular container shape, and the coolant passageway 32 may be formed in a quadrangular plate shape having a vacant inner space in which the coolant may flow. The coolant distributor 34 may be mounted on a right surface of the coolant passageway 32, and in the illustrated exemplary embodiment, the coolant inlet 35 may be disposed at a lower-right side of the exhaust pipe 12 to cause the coolant to flow into the coolant distributor 34. The coolant collector 36 may be mounted on a left surface of the coolant passageway 32, and in the illustrated exemplary embodiment, the coolant outlet 37 may be disposed at an upper-left side of the exhaust pipe 12 to discharge the coolant through the coolant collector 36.

As illustrated in FIG. 2, the coolant, which flows through the coolant passageway 32, and the exhaust gas, which flows through the first exhaust gas passageway 40, may flow in opposite directions, and in this process, the high-temperature exhaust gas may be configured to heat the coolant. The coolant collector 36, the coolant passageway 32, and the coolant distributor 34 may be integrally formed to be disposed sequentially in a longitudinal direction along the exhaust pipe 12, the respective coolant collectors 36 may be connected by curved pipes, and the respective coolant distributors 34 may be connected by curved pipes.

An operation of the aforementioned structure for utilizing exhaust heat of a vehicle according to the exemplary embodiment of the present invention will be described below.

As illustrated in FIG. 4, when the engine is driven when the vehicle initially starts, the exhaust gas discharged from the engine may flow into the exhaust pipe 12, and in this case, the first valve 42 may be configured to open the first exhaust gas passageway 40, and the second valve 18 may be configured to close the bypass passageway 14. Therefore, the exhaust gas may flow through the first exhaust gas passageway 40 and the second exhaust gas passageway 16, and the high-temperature exhaust gas, which flows through the first exhaust gas passageway 40, may be configured to directly heat the coolant that flows through the coolant passageway 32. Accordingly, the structure for utilizing exhaust heat of a vehicle according to the exemplary embodiment of the present invention may operate as a warming up device of the engine.

As illustrated in FIG. 5, when the vehicle runs, the engine may be sufficiently warmed up, and the first valve 42 may be configured to close the first exhaust gas passageway 40, and the second valve 18 may be configured to close the bypass passageway 14. Therefore, the exhaust gas may flow through the second exhaust gas passageway 16, the high-temperature exhaust gas may be configured to heat the one side surface (e.g., a first side surface) of the thermoelectric element 20, and the other side surface (e.g., a second side surface) of the thermoelectric element 20 may be cooled by the coolant that flows through the coolant passageway 32.

Accordingly, a temperature difference may occur between both side surfaces of the thermoelectric element 20, and electricity may be produced in the thermoelectric element 20 due to the temperature difference, and the electricity produced by the thermoelectric element 20 may charge the battery electrically connected to the thermoelectric element 20. Thus, the structure for utilizing exhaust heat of a vehicle according to the exemplary embodiment of the present invention may operate as a thermoelectric power generating device.

As illustrated in FIG. 6, when the vehicle runs in an overloaded state, a load of the engine may increase and the first valve 42 may be configured to close the first exhaust gas passageway 40, and the second valve 18 may be configured to open the bypass passageway 14. Therefore, a substantially small amount of exhaust gas may flow through the second exhaust gas passageway 16, and most of the exhaust gas may flow through the bypass passageway 14, to prevent the vehicle from being overheated.

The aforementioned present invention is not limited to the aforementioned exemplary embodiments and the accompanying drawings, and it will be obvious to those skilled in the technical field to which the present invention pertains that various substitutions, modifications, and changes may be made without departing from the scope and spirit of the present invention.

What is claimed is:

1. A structure for utilizing exhaust heat of a vehicle, comprising:
a first part that includes an exhaust pipe in which exhaust gas having a predetermined temperature passes through and which is heated by exchanging heat with the exhaust gas, and a bypass passageway installed within the exhaust pipe and through which the exhaust gas is bypassed;
a thermoelectric element attached to an exterior of the exhaust pipe, formed by bonding a P-type semiconductor and an N-type semiconductor, and configured to produce electricity using a thermoelectric effect;
a second part attached to the exterior of the thermoelectric element and in which coolant flows;
a first exhaust gas passageway installed within the second part in a longitudinal direction and in which the exhaust gas passes through to heat the coolant; and
a first valve formed between the exhaust pipe and the first exhaust gas passageway and slidably installed to open and close the first exhaust gas passageway,
wherein operations of warming up an engine and generating thermoelectric power are performed simultaneously.

2. The structure of claim 1, wherein the first valve is formed as a ring-shaped band that is coupled to the exhaust pipe.

3. The structure of claim 1, wherein the first part includes:
a second exhaust gas passageway formed between the exhaust pipe and the bypass passageway to allow the exhaust gas to pass therethrough; and
a second valve rotatably installed at a rear end of the bypass passageway to adjust an amount of exhaust gas that is bypassed.

4. The structure of claim 1, wherein the second part includes:
a coolant passageway coupled to an exterior of the thermoelectric element and configured to cool a contact surface with the thermoelectric element using the coolant that flows in the coolant passageway;
a coolant distributor mounted to a first side of the coolant passageway to communicate with the coolant passageway, and having a coolant inlet into which the coolant flows; and
a coolant collector mounted to a second side of the coolant passageway to communicate with the coolant passageway, and having a coolant outlet from which the coolant is discharged,
wherein the coolant passageway, the coolant distributor, and the coolant collector are integrally formed to be disposed in a longitudinal direction.

\* \* \* \* \*